Patented Oct. 16, 1934

1,976,922

UNITED STATES PATENT OFFICE 1,976,922

DIALKYL-AMINO-ALKYL-ESTERS OF HYDROXY-3 CARBOXY-DIPHENYLS

Walter G. Christiansen, Brooklyn, N. Y., and Adelbert W. Harvey, Pittsburgh, Pa., assignors to E. R. Squibb & Sons, Brooklyn, N. Y., a corporation of New York No Drawing. Application June 9, 1932, Serial No. 616,364

21 Claims. (Cl. 167—52)

This invention relates to esters of hydroxy-3-carboxy-diphenyl, such as the dialkyl-amino-alkyl-esters of 3-carboxy-4-hydroxy-diphenyl and 3-carboxy-2-hydroxy-diphenyl and salts thereof, and particularly 3-β-diethyl-amino-carbethoxy-4-hydroxy-diphenyl and its salts. It includes the new compounds and anesthetics comprising the esters or their salts.

The new compounds are advantageously prepared by converting the hydroxy-3-carboxy-diphenyl to a salt, forming a halide ester, preferably an alkyl-bromo ester from the salt and then forming the dialkyl-amino-alkyl ester from this. The steps of the process may be illustrated by the following series of compounds:

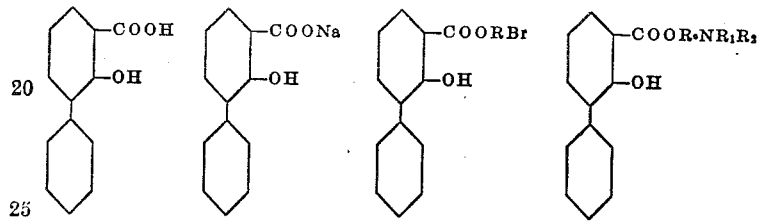

in which R represents a polymethylene group and $R_1$ and $R_2$ are alkyl groups. The invention relates more particularly to those compounds in which the hydroxy group is ortho to the carboxy group.

The method is illustrated by the following method of preparing 3-β-diethyl-amino-carbethoxy-4-hydroxy-diphenyl, starting with 3-carboxy-4-hydroxy-diphenyl prepared by the method disclosed in the application of Adelbert W. Harvey, Serial No. 615,473 filed June 4, 1932.

170 grams of 4-hydroxy-diphenyl is converted into the sodium phenolate by heating to boiling with 40 grams of sodium hydroxide in 400–600 cc. of solution. The sodium phenolate may be recovered by direct evaporation over a free flame or by any other suitable method of evaporation. Care should be taken to prevent the solution or the incompletely dried mixture from absorbing carbon dioxide. Final drying of the phenolate is carried out in vacuo, about 10 mm., at 180° C. for some time, usually five hours, after no more water is collected in an ice trap.

The dry pulverized phenolate is treated with carbon dioxide in an autoclave at approximately 90 pounds per square inch to form the sodium salt of 3-carboxy-4-hydroxy-diphenyl. The temperature is held at 110–120° C., for one hour, increased to 160–170° C., and held at the latter temperature for 3–4 hours. The reaction product is placed in 3000–4000 cc. of water, heated to boiling, and, preferably after filtering, treated with carbon dioxide until no more 4-hydroxy-diphenyl is precipitated. The suspension is filtered to remove the unconverted 4-hydroxy-diphenyl and the 3-carboxy-4-hydroxy-diphenyl is precipitated by acidification with mineral acid. The product is then filtered off, washed with water and dried.

42.8 grams (0.2 mole) of 3-carboxy-4-hydroxy-diphenyl is converted into the sodium salt by dissolving in an aqueous solution containing 8.0 grams (0.2 mole) of sodium hydroxide. The dry sodium salt is obtained by evaporation to dryness, followed by several hours heating at a temperature of 110° C. or higher. The dry powdered sodium salt is treated, either in a flask fitted with an efficient reflux condenser or in a sealed tube, with an excess of ethylene bromide and heated for five hours. In the preferred method, using a flask and reflux condenser, heating was done with an oil bath held at 150–155° C., and the materials were mechanically agitated. At the end of the reaction period the solution of the reaction product in ethylene bromide is filtered from the precipitated sodium bromide. The crude reaction products may then be recovered by removal of the excess ethylene-bromide by distillation, preferably under reduced pressure.

Separation of the desired product, 3-β-bromo-carbethoxy-4-hydroxy-diphenyl from the by-product of ethylene glycol di-ester is accomplished by extraction with a suitable solvent, such as ether, in which the β-bromo ester is soluble, followed by evaporation of the solvent. The product is a viscous slightly yellow oil.

32.1 grams (0.1 mole) of 3-β-bromo-carbethoxy-4-hydroxy-diphenyl is treated with an excess over 14.6 grams (0.2 mole) of diethyl amine. The materials react, with slight evolution of heat, to form a jelly-like mass mixed through with colorless crystals of diethyl-amine-hydrobromide. The mixture is heated for three hours in a water bath at 60° C.

The reaction products are separated by removal of the excess of diethyl-amine by evaporation, after which the residue is suspended in water and the aqueous suspension extracted with benzene. The resulting benzene extract, after washing with water, contains principally the desired β-diethyl-amino-ethyl ester and some acid insoluble by-products. The benzene solution is next extracted with dilute hydrochloric acid which removes the desired ester as its water soluble hydrochloride. The ester is then precipitated from the solution of its hydrochloride, by neutralization with sodium hydroxide or other alkali, and taken up in benzene and the benzene solution dried with sodium sulfate. Dry hydrogen chloride passed into the benzene solution precipitates the hydrochloride as a gelatinous crystalline mass which may be filtered off and dried giving a nearly white product. Purification of the 3-β-diethyl-amino-carbethoxy-4-hydroxy-diphenyl-hydrochloride may be accomplished by crystallization from absolute ethyl alcohol.

The product, in the form of the hydrochloride, is a white crystalline substance which is soluble in water. It melts at 167 to 168.5° C. with effervescence. The free ester is an almost colorless oil.

Instead of employing ethylene bromide, other dihalogen aliphatic compounds such as Br CH$_2$CH$_2$CH$_2$Br and Br CH$_2$CH$_2$CH$_2$CH$_2$Br, etc. may be employed to form other esters. Other dialkyl-amino derivatives may be formed by employing methyl-ethyl-amine or dibutyl or dipropyl-amine, etc. instead of diethyl-amine in converting bromo-alkyl ester to the dialkyl-amino ester.

Starting with 3-carboxy-2-hydroxy-diphenyl and employing similar reactions corresponding alkyl derivatives may be formed in which the hydroxy group is in the 2 instead of the 4 position.

In employing the compounds of this invention as local anesthetics, it is advantageous to use them in solution in a suitable solvent. To prepare aqueous solutions it is desirable to use them in the form of their salts such as the hydrochlorides, etc. The solutions may be buffered with an alkaline buffering agent such as a phosphate.

A two percent aqueous solution of 3-β-diethyl-amino-carbethoxy-4-hydroxy-diphenyl buffered with sodium phosphate has been found satisfactory as a local anesthetic.

We claim:

1. A compound of the group consisting of dialkyl-amino-alkyl-esters of hydroxy-3-carboxy-diphenyls and inorganic salts of such esters.

2. A compound of the group consisting of dialkyl-amino-alkyl esters of 3-carboxy-diphenyl having an hydroxy group ortho to the carboxy group, and inorganic salts of such esters.

3. Esters having the following general formula:

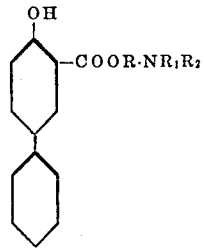

where R, R$_1$ and R$_2$ are alkyl radicals.

4. Inorganic salts of the esters defined in claim 3.

5. Esters having the following general formula:

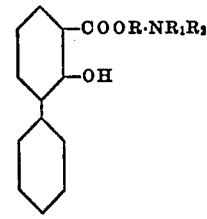

where R, R$_1$ and R$_2$ are alkyl radicals.

6. Inorganic salts of the esters defined in claim 5.

7. An hydrochloride of a dialkyl-amino-alkyl-ester of 3-carboxy-diphenyl having an hydroxy group ortho to the carboxy group.

8. 3-β-diethyl-amino-carbethoxy-4-hydroxy-diphenyl.

9. Salts of 3-β-diethyl-amino-carbethoxy-4-hydroxy-diphenyl.

10. An anesthetic comprising a solution of a dialkyl-amino-alkyl ester of an hydroxy-3-carboxy-diphenyl.

11. An anesthetic comprising a solution of a dialkyl-amino-alkyl ester of 3-carboxy-4-hydroxy-diphenyl.

12. An anesthetic comprising a solution of a dialkyl-amino-alkyl ester of 3-carboxy-2-hydroxy-diphenyl.

13. An anesthetic comprising an aqueous solution of a salt of a dialkyl-amino-alkyl ester of 3-carboxy-diphenyl having an hydroxy group in a position ortho to the carboxy group.

14. An anesthetic comprising an aqueous solution of a buffering agent and the hydrochloride of a dialkyl-amino-alkyl ester of 3-carboxy-4-hydroxy-diphenyl.

15. An anesthetic comprising the hydrochloride of 3-β-diethyl-amino-carbethoxy-4-hydroxy-diphenyl and an alkaline buffering agent.

16. The method of preparing the dialkyl-amino-alkyl-ester of hydroxy-3-carboxy-diphenyls which comprises converting the free carboxy acid to a salt, forming a halide ester from the salt and then forming the dialkyl-amino-alkyl ester from this.

17. The method of preparing the dialkyl-amino-alkyl-esters of 3-carboxy-2-hydroxy-diphenyl which comprises converting the sodium salt of 3-carboxy-2-hydroxy-diphenyl to an alkyl-bromo ester, and then converting this to the dialkyl-amino-alkyl ester.

18. The method of preparing the dialkyl-amino-alkyl-esters of 3-carboxy-4-hydroxy-diphenyl which comprises converting the sodium salt of 3-carboxy-4-hydroxy-diphenyl to an alkyl-bromo-ester, and then converting this to the dialkyl-amino-alkyl-ester.

19. An anesthetic comprising a solution of a dialkyl-aminoalkyl ester of a salt of an hydroxy-3-carboxy diphenyl.

20. An anesthetic comprising a solution of an inorganic salt of a dialkyl-amino-alkyl ester of 3-carboxy-4-hydroxy diphenyl.

21. An anesthetic comprising a solution of an inorganic salt of a dialkyl-amino-alkyl ester of 3-carboxy-2-hydroxy diphenyl.

WALTER G. CHRISTIANSEN.
ADELBERT W. HARVEY.